US008239248B2

(12) United States Patent
Baumgartner et al.

(10) Patent No.: US 8,239,248 B2
(45) Date of Patent: Aug. 7, 2012

(54) TECHNIQUES TO MANAGE INFORMATION FOR DYNAMIC REPORTS USING TIME PERIODS FOR A BUSINESS MODEL

(75) Inventors: Patrick Baumgartner, Kirkland, WA (US); Alisson Sol, Cambridge (GB); Peter Eberhardy, Seattle, WA (US); Luming Wang, Bellevue, WA (US); Mark Yang, Sammamish, WA (US); Amer Shahnawaz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 993 days.

(21) Appl. No.: 11/714,975

(22) Filed: Mar. 7, 2007

(65) Prior Publication Data
US 2008/0221958 A1  Sep. 11, 2008

(51) Int. Cl.
*G06Q 40/00* (2006.01)
(52) U.S. Cl. ............. 705/8; 705/7; 705/10; 705/35; 705/36; 705/37
(58) Field of Classification Search ............. 705/7, 8, 705/10, 35, 36, 37
See application file for complete search history.

(56) References Cited

U.S. PATENT DOCUMENTS

| 5,189,608 | A | 2/1993 | Lyons et al. |
| 5,544,281 | A | 8/1996 | Maruoka et al. |
| 6,681,211 | B1 * | 1/2004 | Gatto ............. 705/36 R |
| 6,745,150 | B1 | 6/2004 | Breiman |
| 7,010,496 | B2 | 3/2006 | Wong |
| 7,130,822 | B1 | 10/2006 | Their et al. |
| 7,617,148 | B2 * | 11/2009 | Breslow et al. ............. 705/37 |
| 2003/0028459 | A1 | 2/2003 | Hillel |
| 2003/0088491 | A1 * | 5/2003 | Liu et al. ............. 705/36 |
| 2005/0131755 | A1 | 6/2005 | Chen et al. |
| 2006/0184414 | A1 | 8/2006 | Pappas et al. |
| 2006/0212339 | A1 | 9/2006 | Hubbard et al. |

FOREIGN PATENT DOCUMENTS
WO   WO2005122019 A1   12/2005

OTHER PUBLICATIONS

"Predictive Planning", Date: 2006, http://www.businessobjects.com/pdf/products/planning/predictive_planning.pdf.
"ReadHyPlan", Date: 2005, http://www.hyperion.com/downloads/partners/accenture_readhyplan_overview.pdf.
Smith, John, "Building a Rolling Forecast Process to Help Deliver Organisational Targets", http://www.descisys.com/Building%20a%20Rolling%20Forecast%20Process%20to%20Help%20Deliver%20Organisational%20Targets.htm.

* cited by examiner

Primary Examiner — Nga B. Nguyen

(57) ABSTRACT

Techniques to manage information for dynamic reports are described. An apparatus may comprise a business planning application module to update a current period reference to a time member of a time dimension, generate a rolling data entry form with actual data members and forecast data members based on the current period reference, and set a data locking mode for the actual data members and a data access mode for the forecast data members. Other embodiments are described and claimed.

20 Claims, 5 Drawing Sheets

400

INITIATE A BUSINESS PLANNING APPLICATION MODULE
402

UPDATE A CURRENT PERIOD REFERENCE TO A TIME MEMBER OF A TIME DIMENSION
404

GENERATE A ROLLING DATA ENTRY FORM WITH ACTUAL DATA MEMBERS AND FORECAST DATA MEMBERS SEPARATED BY THE CURRENT PERIOD REFERENCE, WITH A DATA LOCKING MODE SET FOR THE ACTUAL DATA MEMBERS AND A DATA ACCESS MODE SET FOR THE FORECAST DATA MEMBERS
406

FIG. 4

TECHNIQUES TO MANAGE INFORMATION FOR DYNAMIC REPORTS USING TIME PERIODS FOR A BUSINESS MODEL

BACKGROUND

Many businesses typically need to generate data forms and reports on a periodic basis to display various types of business related data, such as financial modeling data. In some cases, the reports are considered "rolling" reports since they tend to modify the data over certain time periods. For example, a revenue forecast may include estimated revenue numbers collected from contributors each period for a certain number of future periods, while also displaying actual revenue numbers from previous periods. As time periods change, however, it may become increasingly difficult to create and manage such data forms and reports without manual intervention. This may be further exacerbated when multiple users are contributing data at different times from different geographic locations. Consequently, there may be substantial need for techniques to improve the creation and management of such time-varying data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to techniques for managing data entry for dynamic reports. This may be particularly useful for business entities, for example. Some embodiments may be particularly directed to managing data entry within a rolling planning, budgeting, or forecasting business cycle. In one embodiment, for example, this may be accomplished using an automatically updated current period reference. For example, a revenue forecast may include estimated revenue numbers collected from contributors each period for a certain number of future periods, while also displaying actual revenue numbers from previous periods. To facilitate such a process, it may be necessary to create and maintain data forms that capture the correct data relative to the time when the data form or report is generated. This may be accomplished by managing a current period reference. Additionally, permissions and security may need to be managed appropriately to prevent users from purposefully or unknowingly submitting data for periods outside of the desired scope of the rolling budget, plan, or forecast.

In one embodiment, for example, a business planning application module may be arranged to update a current period reference to a time member of a time dimension. The business planning application module may generate a rolling data entry form with actual data members and forecast data members based on the current period reference. The business planning application module may set a data locking mode for the actual data members to prevent modifications to the actual data members. The business planning application module may also set a data access mode for the forecast data members to allow modifications to the forecast data members. In this manner, the business planning module may automatically update a data form with the appropriate data relative to the current period reference, while managing and controlling data entry permissions for the data form to prevent unauthorized modifications to the data provided by the data form. Other embodiments are described and claimed.

BRIEF DESCRIPTION OF THE DRAWINGS

FIG. 4 illustrates one embodiment of a logic flow.

DETAILED DESCRIPTION

Figure 1:
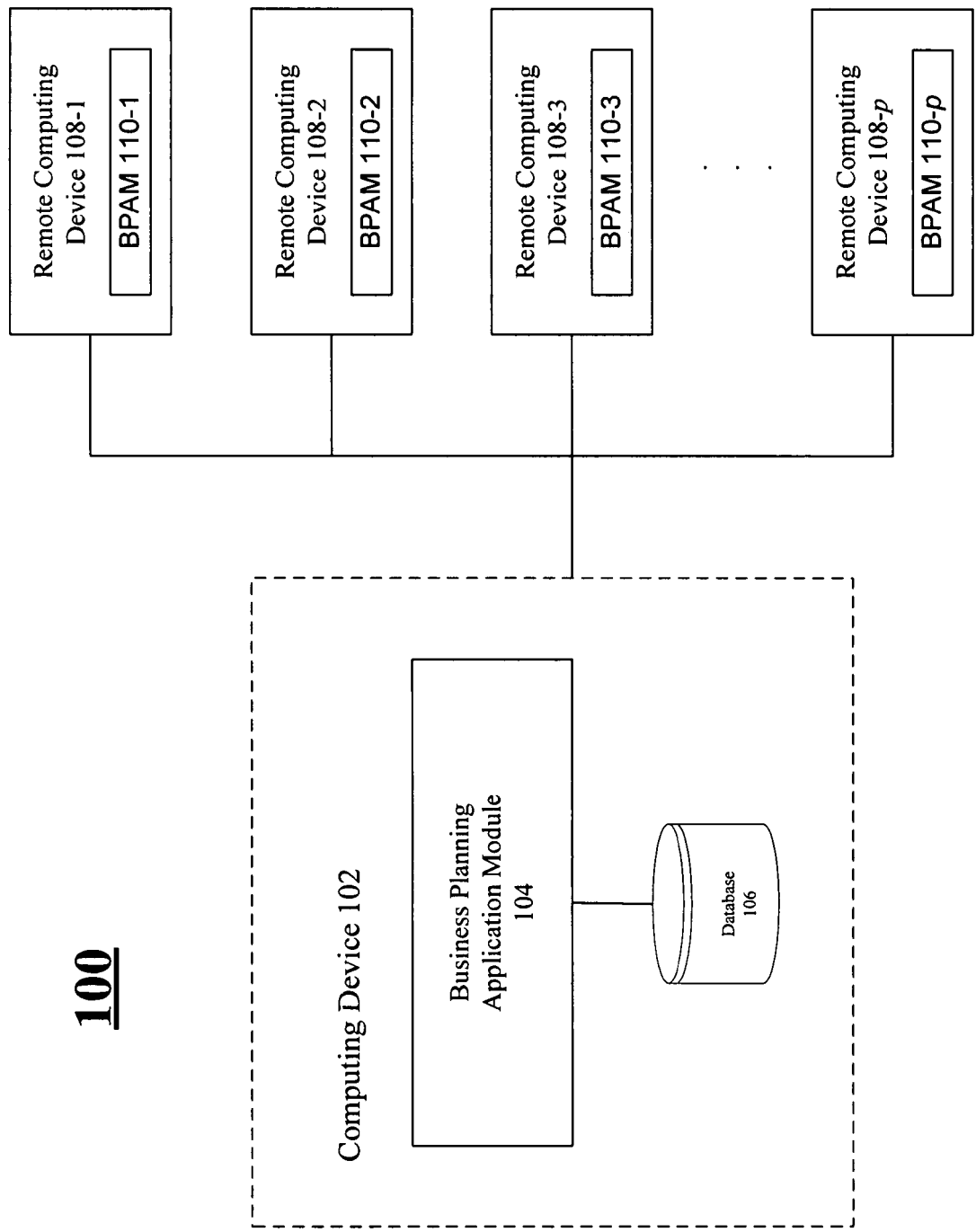
FIG. 1 illustrates one embodiment of business planning application system.

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" are not necessarily referring to the same embodiment.

Various embodiments may be directed to managing various business artifacts that reference a time dimension and that are related to a data entry process and/or reporting process for a business model, business entity or business application. Such artifacts can be made dynamic with respect to the time dimension. Some example artifacts that are made dynamic with respect to time are security artifacts, report layout artifacts, and process timing artifacts. Although some embodiments may be described in the context of such exemplary artifacts, it may be appreciated that additional business artifacts that reference time and that relate to the data entry process or reporting process may be dynamically managed as well. For example, calculations or data loading artifacts could also be made dynamic with respect to time in order to stay in synchronization with reporting and data entry. The embodiments are not limited in this context.

Some embodiments in particular may be directed to managing time-varying data and data entry techniques for business entities. Data entry on a "rolling" monthly or quarterly basis is a standard practice within most businesses. In a rolling process numbers are collected from contributors each period for a certain number of future periods while also displaying actual data from previous periods. To facilitate such a process it is necessary to create and maintain data forms that capture the correct data relative to the "current period" from contributors during each period. Additionally, permissions and security need to be managed appropriately to prevent users from purposefully or unknowingly submitting data for periods outside of the desired scope of the rolling budget, plan, or forecast.

In one embodiment, for example, assume that a business model, a data entry form, and a process cycle have been created. Within the business model a "current period" that references a member of the time dimension in the business model has been defined. The data entry form and process cycle both reference the current period so that updating the current period definition will also dynamically update the scope of the process and the data displayed and collected in the data entry form. In this example, users are entering data for all periods between the current period and the end of the year and viewing actual data between the start of the year and the period prior to the current period. The concept used to achieve this behavior can also be generalized to rolling forms and processes that have dynamic start dates and end dates where users view M prior periods and enter data for N future periods with no specific bound to the process, where M and N represent any positive integer values.

Various embodiments combine several different types of functionality into a single solution for current period based management of data entry within a rolling planning budgeting, or forecasting cycle. For example, one embodiment may implement a business model wide definition of current period that may be modified over time. In another example, one embodiment may facilitate the construction of asymmetrical forms and reports. In yet another example, one embodiment may apply or enforce scenario and time data permissions at the process level in terms of the current period definition. The combination of a schedulable business model current period definition with asymmetrical form construction and process level security for the time dimension provides several advantages over conventional techniques. Each of these elements effectively reduces process maintenance costs, such as manual update of forms or security. When used in combination they allow a completely automated-dynamic process with data entry forms and reports to be constructed that requires reduced maintenance with respect to the rolling aspects of the process.

FIG. 1 illustrates a block diagram of a business planning application system 100. The business planning application system 100 may represent any system arranged to store, process, communicate, and otherwise manage business planning processes or operations for an electronic system or collection of electronic systems. As shown in FIG. 1, one embodiment of the business planning application system 100 may include a computing device 102 coupled to one or more remote computing devices 108-1-*p*, where p represents a positive integer value. Computing device 102 may comprise a business planning application module 104 coupled to a database 106. Each of remote computing devices 108-1-*p* may include a respective business planning application module 110-1-*p*. In some cases, the modules 104, 110 may be the same or similar modules. In other cases, the modules 104, 110 may be arranged as client-server applications or peer-to-peer applications as desired for a given implementation. Additional details for one embodiment of computing device 102 and remote computing devices 108-1-*p* may be further illustrated and described with reference to FIG. 5.

As used herein the term "module" may include any structure implemented using hardware elements, software elements, or a combination of hardware and software elements. In one embodiment, for example, the modules described herein are typically implemented as software elements stored in memory and executed by a processor to perform certain defined operations. It may be appreciated that the defined operations, however, may be implemented using more or less modules as desired for a given implementation. It may be further appreciated that the defined operations may be implemented using hardware elements based on various design and performance constraints. The embodiments are not limited in this context.

In various embodiments, the business planning application system 100 may be used to create, collect, display and otherwise manage financial data for various types of financial application programs or systems. With respect to computing device 102 and/or remote computing devices 108-1-*p*, the financial data may be stored and accessed via any number of memory units, storage media, machine readable media, or computer-readable media implemented for a given computing device, such as financial database 106 shown with computing device 102, for example. Computing device 102 and remote computing devices 108-1-*p* may represent any type of electronic device having the appropriate hardware, software or combination hardware and software arranged to execute the operations of business planning application module 104.

In various embodiments, the business planning application system 100 may include the business planning application module 104. The business planning application module 104 may be arranged to update a current period reference to a time member of a time dimension. The business planning application module 104 may generate a rolling data entry form with actual data members and forecast data members based on the current period reference. The business planning application module 104 may set a data locking mode for the actual data members and a data access mode for the forecast data members. In this manner, the rolling data entry form may automatically update the actual data members relative to the current business period, and implement a set of data entry rules that prevent the actual data members from being modified, while simultaneously providing the opportunity for a user or system to update the forecast data members. The automatic updates may be accomplished, for example, on a periodic basis, an aperiodic basis, on demand, event driven, whenever the rolling data entry form is opened by a user, and so forth. This may be particularly useful for knowledge workers and teams of knowledge workers, particularly if geographically distributed, for a given business entity.

In various embodiments, the business planning application module 104 may store, process and retrieve data from the database 106. In one embodiment, for example, the database 106 may represent a multidimensional database. Multidimensional databases often contain various dimensions comprising a large number of dimension members. If the database 106, for example, is for a manufacturing or distributing company, the database may include members such as products, customers, geographical regions, and financial accounts. These members are often organized into hierarchies and may include complex organizational structures. Multidimensional databases provide a high degree of flexibility in the definition of dimensions, units, and unit relationships, regardless of data format. Multidimensional databases are especially useful in financial, sales or marketing applications that involve time series. Large volumes of sales and inventory data can be stored to ultimately be used for logistics and executive planning. For example, data can be more readily segregated by sales region, product, or time period.

Figure 2:
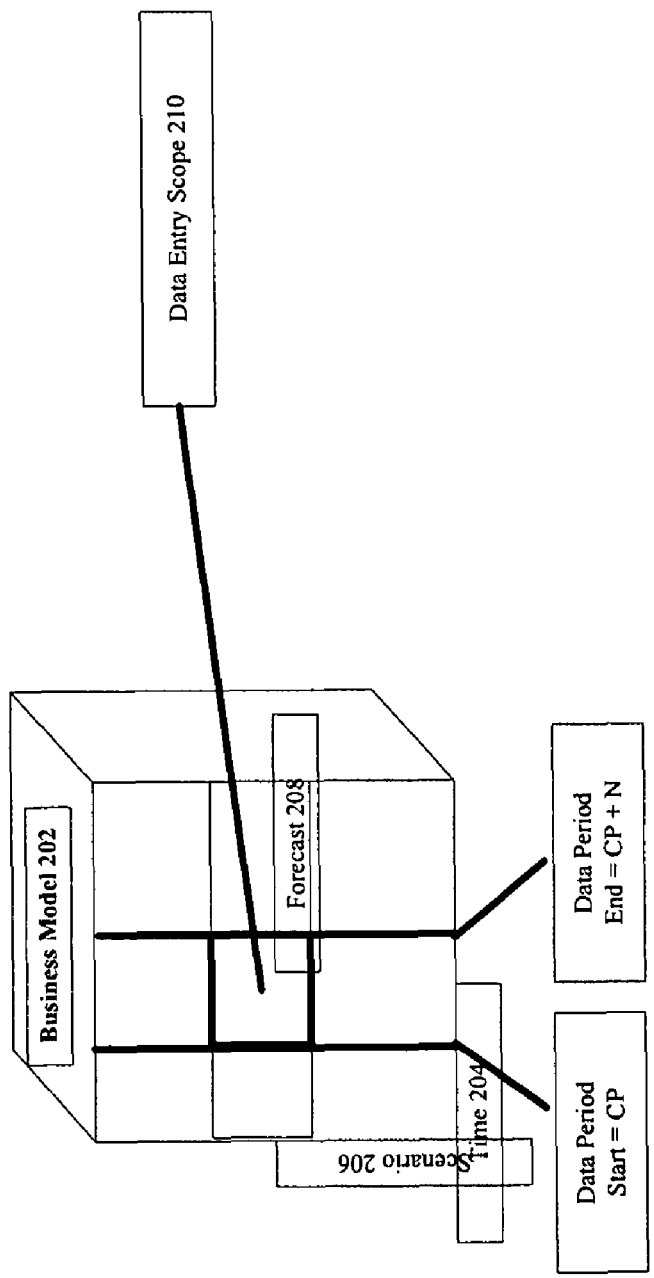
FIG. 2 illustrates one embodiment of a data cube.

FIG. 2 illustrates one embodiment of a data cube 200. Multidimensional databases may implement a data cube, which is a conceptual representation of a database which can be implemented in a variety of ways, including top-down, bottom-up, and arrays. As shown in FIG. 2, the data cube 200 may comprise multiple dimensions, including a business model dimension 202, a time dimension 204, a scenario dimension 206, and a forecast dimension 208. The intersection of these dimensions forms a data entry scope 210, with a data period start set to a current period (CP) reference or definition, and a data period end set to CP+N.

In various embodiments, the business planning application module 104 may be arranged to automatically update the current period reference to a time member representing a business defined period for a business reporting cycle. In one embodiment, for example, the business planning application module 104 may update the actual data members and forecast data members for a rolling data entry form when the current period reference is updated. Security definitions are also updated accordingly so that only requested data can be submitted. This may be further described with reference to FIGS. 3A-C.

Figure 3A:
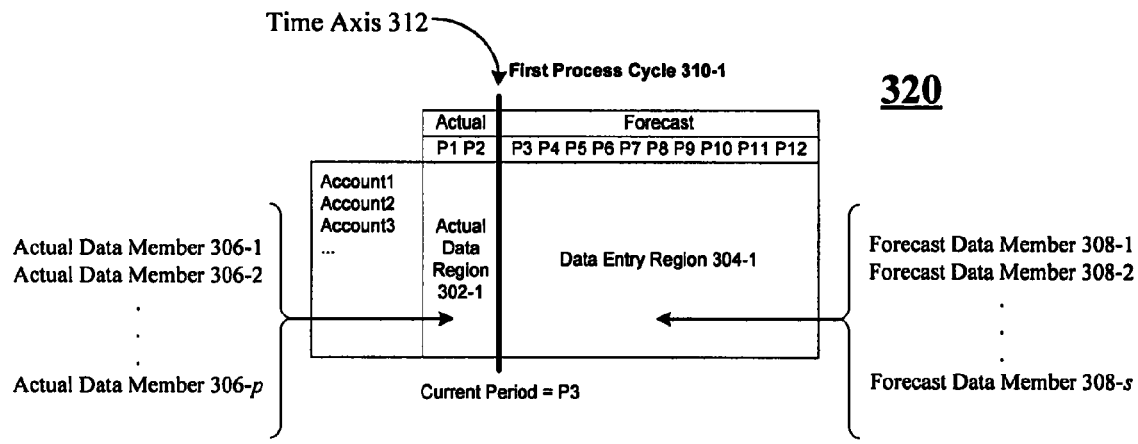
FIG. 3A illustrates one embodiment of a first data form.
Figure 3B:
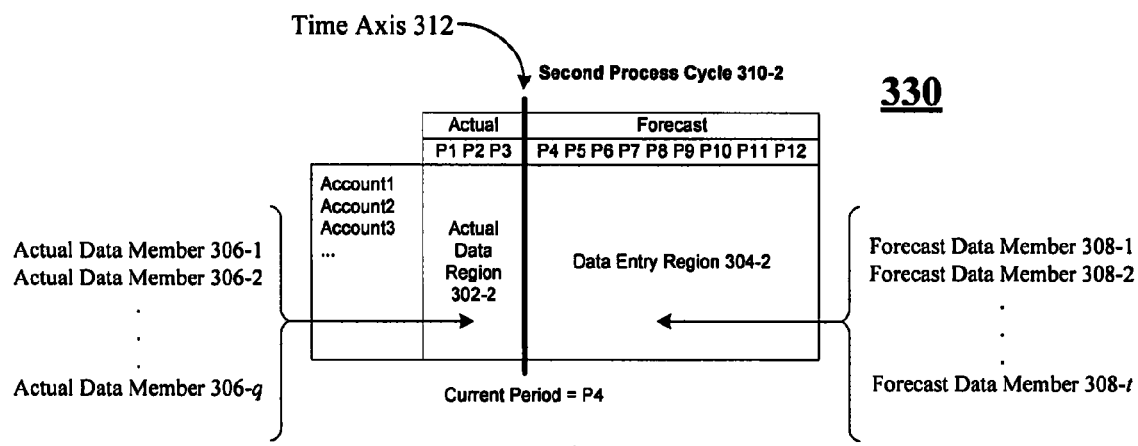
FIG. 3B illustrates one embodiment of a second data form.
Figure 3C:
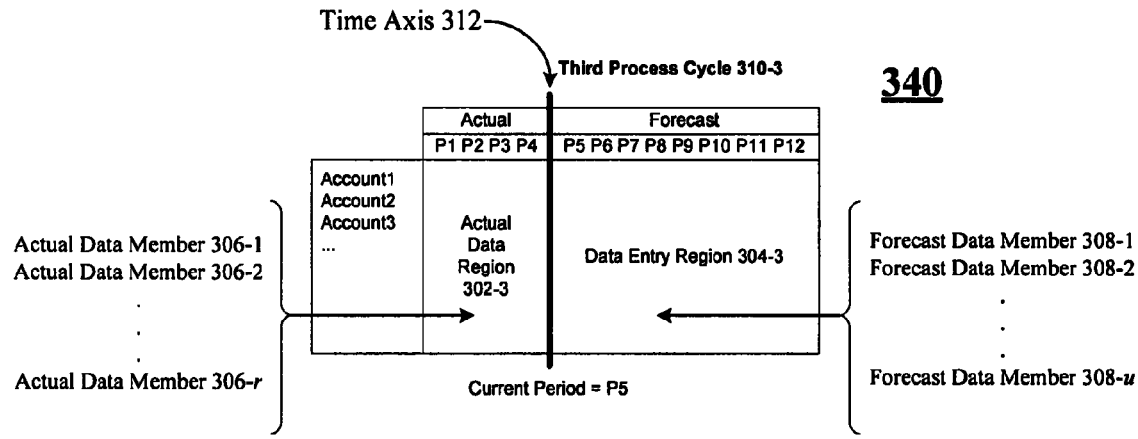
FIG. 3C illustrates one embodiment of a third data form.

FIGS. 3A-C may provide an illustration of how updating the current period advances a rolling data entry form to the next business period. The business defined period may represent a configurable or non-configurable value representing any desired time interval or period, such as days, weeks, months, quarters, years, and so forth. The business defined period typically corresponds to a business reporting cycle set in accordance with various accounting or financial practices.

FIG. 3A illustrates one embodiment of a data form 320. The data form 320 may comprise an example of a view for a rolling data entry form generated and managed by the business planning application module 104. More particularly, the data form 320 may illustrate a rolling data entry form at an instance of time during a first process cycle 310-1. As shown in FIG. 3A, the data form 320 may comprise a list of accounts, with each account having financial data for twelve reporting periods. The financial data may be divided into two types. The first type of financial data includes actual data members 306-1-$p$ displayed in an actual data region 302-1. The second type of financial data includes forecast data members 308-1-$s$ displayed in a forecast data region 304-1. The actual data region 302-1 and the forecast data region 304-1 may be divided by a time axis 312 representing a member of the time dimension having a granularity matching the reporting periods. In this case, for example, the current period reference may comprise a value representing the third reporting period P3. Based on the time axis 312 and current period value, the actual data region 302-1 displays a set of actual data members 306-1-$p$ for reporting periods P1 and P2, while the forecast data region 304-1 displays a set of forecast data members 308-1-$s$ for reporting periods P3 through P12.

FIG. 3B illustrates one embodiment of a data form 330. The data form 330 may be similar to the data form 320, while illustrating a change in time from the first process cycle 310-1 to a second process cycle 310-2. As shown in FIG. 3B, the time axis 312 and the current period reference have been updated to represent the fourth reporting period P4. Based on the updated time axis 312 and current period value, the actual data region 302-2 displays a set of actual data members 306-1-$q$ for reporting periods P1 through P3, while the forecast data region 304-2 displays a set of forecast data members 308-1-$t$ for reporting periods P4 through P12. Consequently, as the second process cycle 310-2 occurred, the business planning forecast module 104 dynamically updates the data regions 302-2, 304-2 for data form 330 accordingly.

FIG. 3C illustrates one embodiment of a data form 340. The data form 340 may be similar to the data form 330, while illustrating a change in time from the second process cycle 310-2 to a third process cycle 310-3. As shown in FIG. 3C, the time axis 312 and the current period reference have been updated to represent the fifth reporting period P5. Continuing with the example views provided by FIGS. 3B and 3C, based on the updated time axis 312 and current period value, the actual data region 302-3 displays a set of actual data members 306-1-$r$ for reporting periods P1 through P4, while the forecast data region 304-3 displays a set of forecast data members 308-1-$u$ for reporting periods P5 through P12. Consequently, as the third process cycle 310-3 occurred, the business planning forecast module 104 dynamically updates the data regions 302-3, 304-3 for data form 340 accordingly. It may be appreciated that this pattern of automatically updating the amount of financial data presented by data regions 302, 304 may continue for each executed process cycle 310, as desired for a given implementation.

In one embodiment, for example, the business planning application module 104 may set the data locking mode to deny modifications to the actual data members, and the data access mode to permit modifications to the forecast data members. Consistent with the data entry rules and permissions set implemented by the business planning application module 104, the actual data region 302 may be placed in a data lock mode that prevents the actual data members 306 from being modified, and the forecast data region 304 may be placed in a data access mode that allows the forecast data members 308 to be modified. In this manner, a user will be prevented from accidentally or intentionally modifying valid financial data for a business entity, while retaining the ability to automatically or manually update projected financial data, such as sales forecasting figures, for example.

In one embodiment, for example, the business planning application module 104 may perform an asymmetrical cross-join between time members of the time dimension and data members of a scenario dimension for the data entry form using the current period reference. For example, assume a current period definition or reference is set to CP. An asymmetrical cross-join between a time dimension and scenario dimension for the actual data region 302 may be represented as [P1 to CP−1]*[Actual] or [CP−M to CP−1]*[Actual]. An asymmetrical cross-join between a time dimension and a scenario dimension for the forecast data region 304 may be represented as [CP to P12]*[Forecast] or [CP to CP+N] *[Forecast].

Operations for apparatus 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of apparatus 100 or alternative elements as desired for a given set of design and performance constraints.

FIG. 4 illustrates a logic flow 400. Logic flow 400 may be representative of the operations executed by one or more embodiments described herein. As shown in FIG. 4, the logic flow 400 may initiate a business planning application module at block 402. For example, the business planning application module may be arranged to operate with a defined business model. The business model may be created with the time dimension having the time members and a scenario dimension having the actual data members and forecast data members.

As shown in FIG. 4, the logic flow 400 may update a current period reference to a time member of a time dimension at block 404. For example, the current period reference may be updated to a time member representing a business defined period for a business reporting cycle. In some cases, the updates may be scheduled to the current period reference at defined time intervals.

As shown in FIG. 4, the logic flow 400 may generate a rolling data entry form with actual data members and forecast data members separated by the current period reference, with a data locking mode set for the actual data members and a data access mode set for the forecast data members, at block 406. For example, the data locking mode may be set to prevent modifications to the actual data members. In another example, the data access mode may be set to allow modifications to the forecast data members. The embodiments are not limited in this context.

In one embodiment, for example, the rolling data entry form may be generated with actual data members for a first set of time periods with an actual data time period for the actual data members having an actual data period start value of the current period reference minus M periods and an actual data period end value of the current period reference minus 1 period, where M equals any positive integer.

In one embodiment, for example, the rolling data entry form may be generated with forecast data members for a second set of time periods with a forecast data time period for the forecast data members having a forecast data period start value of the current period reference and a forecast data period end value of the current period reference plus N periods, where N equals any positive integer.

Some of the embodiments may be further described by way of example. Assume a business model has been created with time and scenario dimensions. A dynamic rolling data entry form may be created. A time axis may be defined for the data entry form. When defining the time access for the data entry form, a user can select the following elements to be included in the report through a user interface arranged to allow selection and definitions for various dimension members: (1) P1 to Current Period minus 1; and (2) Current Period to P12.

An asymmetrical cross-join between time and scenario may be created. To display only "actual" data for prior periods and "forecast" data (e.g., budget or planning values) for future periods, the user selects "Actual" and "Forecast" members for the time dimension. Next they must select the "Column by Column" report rendering method which will create an asymmetrical cross-join instead of a complete cross-join when constructing the query for the report. This query has the form of:

$$\{\{[P1 \text{ to Current Period minus } 1]*[Actual]\}, \{[Current \text{ Period to P12}]*[Forecast]\}\}$$

where all members in the range P1 to Current Period minus 1 are intersected with actual data from the scenario dimension, and all members in the range Current Period to P12 are intersected with forecast data from the scenario dimension. This approach can be generalized by using "Current Period +/−M to Current Period +/−N" to support rolling forms with no defined start or end.

Once the time and dimension members are selected and defined, update parameters for setting and updating the current period definition may be created. For example, the user can set the current period defining to a specific member of the time dimension and schedule this definition to update to other members at specific times in the future.

Once the dynamic rolling data entry form has been configured, the rolling planning, budgeting or forecasting cycle may be created. For example, the user creates a process cycle that will repeat on a periodic basis. For this process the user defines a scenario and data period which controls what members of the time dimension can be edited. When selecting the data period the user selects references to the current period. (e.g., Start: Current Period, End: P12)

Each period when the next instance of the process cycle begins the current period definition is updated and data entry forms are distributed. Because of the use of the current period in the data entry forms and the asymmetrical form construction, the data entry forms are dynamically updated when opened and the data submission security for the process cycle is also updated dynamically based on its reference to the current period definition.

Figure 5:
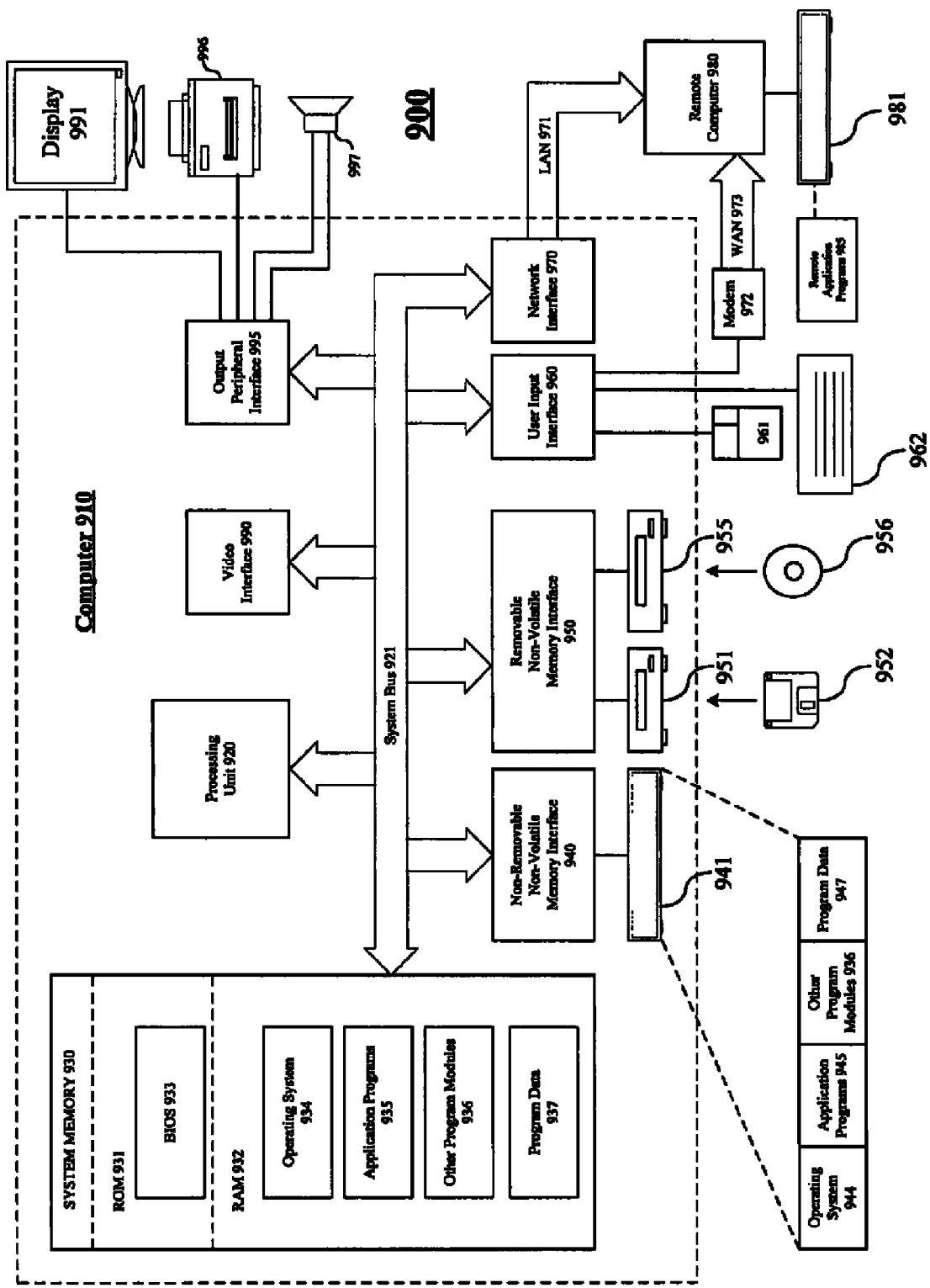
FIG. 5 illustrates one embodiment of a computing system architecture.

FIG. 5 illustrates a block diagram of a computing system architecture 900 suitable for implementing various embodiments, including the business planning application system 100. It may be appreciated that the computing system architecture 900 is only one example of a suitable computing environment and is not intended to suggest any limitation as to the scope of use or functionality of the embodiments. Neither should the computing system architecture 900 be interpreted as having any dependency or requirement relating to any one or combination of components illustrated in the exemplary computing system architecture 900.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 5, the computing system architecture 900 includes a general purpose computing device such as a computer 910. The computer 910 may include various components typically found in a computer or processing system. Some illustrative components of computer 910 may include, but are not limited to, a processing unit 920 and a memory unit 930.

In one embodiment, for example, the computer 910 may include one or more processing units 920. A processing unit 920 may comprise any hardware element or software element arranged to process information or data. Some examples of the processing unit 920 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 920 may be implemented as a general purpose processor. Alternatively, the processing unit 920 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 910 may include one or more memory units 930 coupled to the processing unit 920. A memory unit 930 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 910. The embodiments are not limited in this context.

In one embodiment, for example, the computer 910 may include a system bus 921 that couples various system components including the memory unit 930 to the processing unit 920. A system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 910 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 900. Examples of computer readable media for computing system architecture 900 may include, but are not limited to, volatile and/or nonvolatile memory such as ROM 931 and RAM 932. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 930 includes computer storage media in the form of volatile and/or nonvolatile memory such as ROM 931 and RAM 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 5 illustrates operating system 934, application programs 935, other program modules 936, and program data 937.

The computer 910 may also include other removable/non-removable, volatile/nonvolatile computer storage media. By way of example only, FIG. 5 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 5, provide storage of computer readable instructions, data structures, program modules and other data for the computer 910. In FIG. 5, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor 991, computers may also include other peripheral output devices such as speakers 997 and printer 996, which may be connected through an output peripheral interface 990.

The computer 910 may operate in a networked environment using logical connections to one or more remote computers, such as a remote computer 980. The remote computer 980 may be a personal computer (PC), a server, a router, a network PC, a peer device or other common network node, and typically includes many or all of the elements described above relative to the computer 910, although only a memory storage device 981 has been illustrated in FIG. 5 for clarity. The logical connections depicted in FIG. 5 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other technique suitable for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 5 illustrates remote application programs 985 as residing on memory device 981. It will be appreciated that the network connections shown are exemplary and other techniques for establishing a communications link between the computers may be used. Further, the network connections may be implemented as wired or wireless connections. In the latter case, the computing system architecture 900 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the business planning application system 100 and/or computing system architecture 900 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously provided for the memory unit 130. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
 initiating by a processor a business planning application module;
 updating a current period reference to a time member of a time dimension;
 automatically updating actual data members comprising data from one or more periods prior to said updated current period reference; and
 generating a rolling data entry form comprising:
  the updated actual data members displayed in an actual data region and forecast data members displayed in a forecast data region,
  with a data locking mode set for said actual data members and a data access mode set for said forecast data members,
  said forecast data members comprising data from one or more future periods relative to said current period reference.

2. The method of claim 1, comprising updating said current period reference to a time member representing a business defined period for a business reporting cycle.

3. The method of claim 1, comprising setting said data locking mode to prevent modifications to said actual data members.

4. The method of claim 1, comprising setting said data access mode to allow modifications to said forecast data members.

5. The method of claim 1, comprising creating a business model with said time dimension having said time members and a scenario dimension having said actual data members and forecast data members.

6. The method of claim 1, comprising generating said rolling data entry form with actual data members for a first set of time periods with an actual data time period for said actual data members having an actual data period start value of said current period reference minus M periods and an actual data period end value of said current period reference minus 1 period, where M equals any positive integer.

7. The method of claim 1, comprising generating said rolling data entry form with forecast data members for a second set of time periods with a forecast data time period for said forecast data members having a forecast data period start value of said current period reference and a forecast data period end value of said current period reference plus N periods, where N equals any positive integer.

8. The method of claim 1, comprising scheduling updates to said current period reference at defined time intervals.

9. An article of manufacture comprising a computer readable storage medium containing instructions that if executed enable a system to:
define a current period reference to a first time member of a time dimension;
automatically update actual data members comprising data from one or more periods prior to said updated current period reference;
generate a data entry form comprising:
the updated actual data members displayed in an actual data region and forecast data members displayed in a forecast data region, said forecast data members comprising data from one or more future periods relative to said current period reference;
update said current period reference to a second time member; and
update said actual data members and said forecast data members in said data entry form based on said updated current period reference, said updated actual data members comprising data from one or more periods prior to said second time member, said updated forecast data members comprising data from one or more future periods relative to said second time member.

10. The article of claim 9, further comprising instructions that if executed enable the system to create a business model with said time dimension having said first time member and a scenario dimension having said actual data members and forecast data members.

11. The article of claim 9, said one or more periods prior to said second time member having an actual data period start value of a first period and an actual data period end value of said updated current period reference minus a period.

12. The article of claim 9, said one or more future periods relative to said second time member having a forecast data period start value of said updated current period reference and a forecast data period end value of said updated current period reference plus N periods, where N equals any positive integer.

13. The article of claim 9, further comprising instructions that if executed enable the system to schedule updates to said current period reference at business defined periods.

14. The article of claim 9, further comprising instructions that if executed enable the system to update said actual data members and forecast data members for said data entry form when said current period reference is updated.

15. The article of claim 9, further comprising instructions that if executed enable the system to perform an asymmetrical cross-join between time members of said time dimension and data members of a scenario dimension for said data entry form using said current period reference.

16. An apparatus comprising:
a memory unit containing actual data members and forecast data members;
a business planning application module operative to:
update a current period reference to a time member of a time dimension;
automatically update the actual data members comprising data from one or more periods prior to said updated current period reference;
generate a rolling data entry form comprising said actual data members displayed in an actual data region and said forecast data members displayed in a forecast data region, said forecast data members comprising data from one or more future periods relative to said current period reference; and
set a data locking mode for said actual data members and a data access mode for said forecast data members; and
a processor implementing the business planning application module.

17. The apparatus of claim 16, said business planning application module to update said current period reference to a time member representing a business defined period for a business reporting cycle.

18. The apparatus of claim 16, said business planning application module to set said data locking mode to deny modifications to said actual data members, and said data access mode to permit modifications to said forecast data members.

19. The apparatus of claim 16, said business planning application module to perform an asymmetrical cross-join between time members of said time dimension and data members of a scenario dimension for said data entry form using said current period reference.

20. The apparatus of claim 16, said business planning application module to update said actual data members and forecast data members for said data entry form when said current period reference is updated.

* * * * *